F. A. FROMMANN.
WHEEL.
APPLICATION FILED SEPT. 9, 1910.
1,009,062.
Patented Nov. 21, 1911
3 SHEETS—SHEET 1.
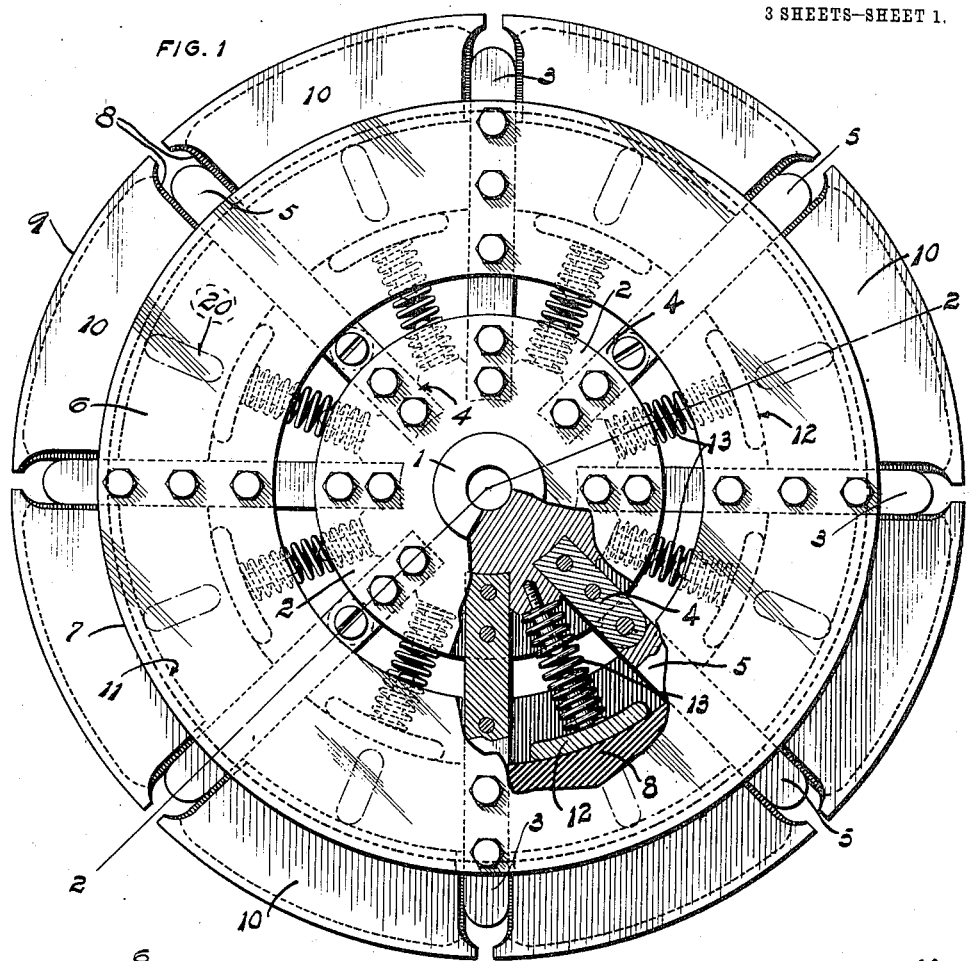
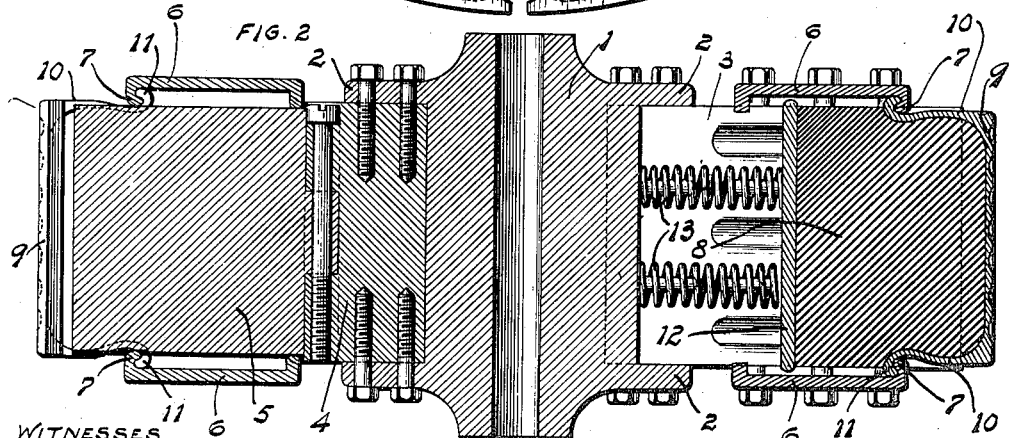
WITNESSES
INVENTOR
FRANKLIN A. FROMMANN
BY ᴀᴛᴛ'ʏ.

F. A. FROMMANN.
WHEEL.
APPLICATION FILED SEPT. 9, 1910.

1,009,062.

Patented Nov. 21, 1911.
3 SHEETS—SHEET 2.

WITNESSES

INVENTOR
FRANKLIN A. FROMMANN
BY
ATT'Y.

F. A. FROMMANN.
WHEEL.
APPLICATION FILED SEPT. 9, 1910.
1,009,062.
Patented Nov. 21, 1911.
3 SHEETS—SHEET 3.
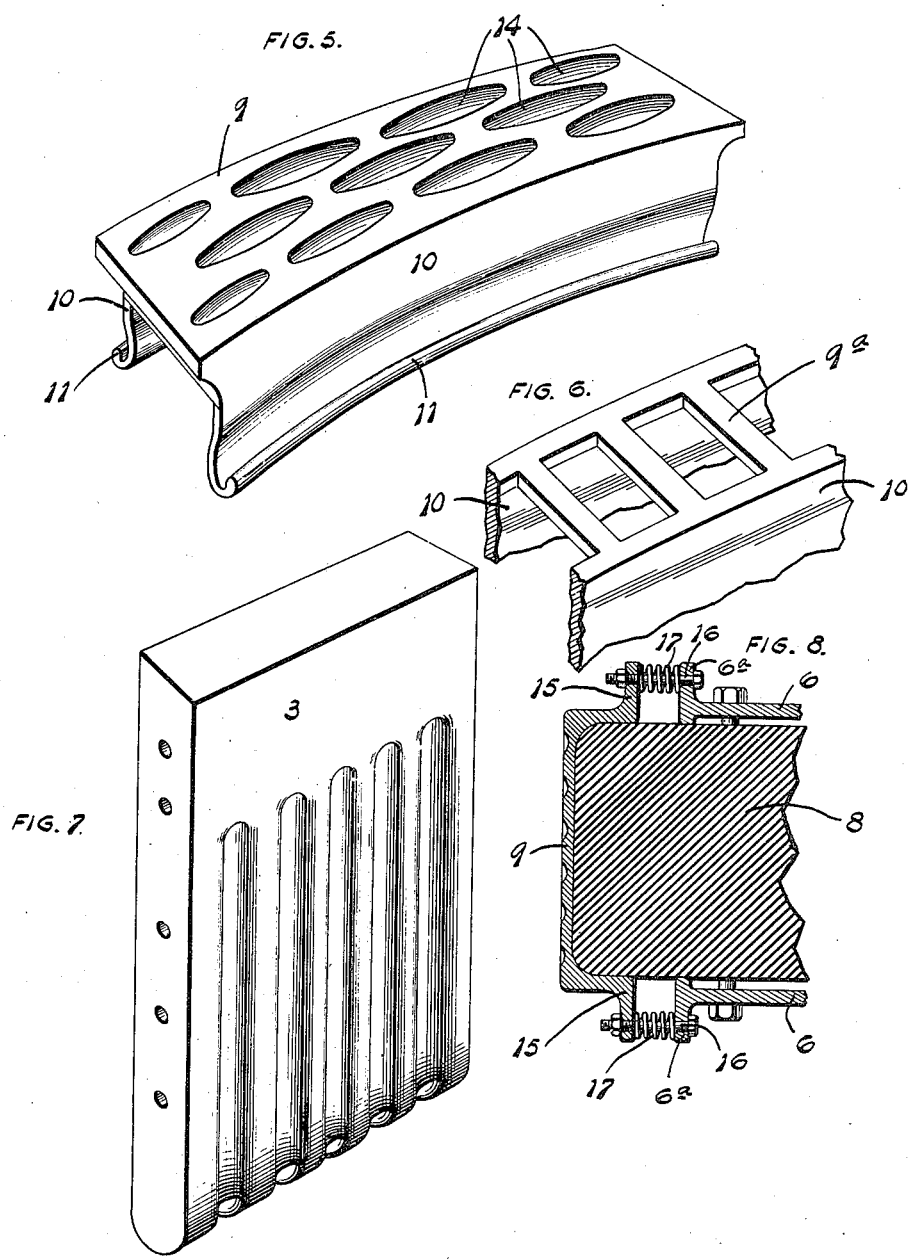
WITNESSES
INVENTOR
FRANKLIN A. FROMMANN

UNITED STATES PATENT OFFICE.

FRANKLIN A. FROMMANN, OF ST. LOUIS, MISSOURI.

WHEEL.

1,009,062.      Specification of Letters Patent.      Patented Nov. 21, 1911.

Application filed September 9, 1910. Serial No. 581,294.

*To all whom it may concern:*

Be it known that I, FRANKLIN A. FROMMANN, a citizen of the United States, residing at St. Louis, Missouri, have invented a certain new and useful Improvement in Wheels, of which the following is a full, clear, and exact description, such as will enable others skilled in the art to which it appertains to make and use the same, reference being had to the accompanying drawings, forming part of this specification, in which—

Figure 3:
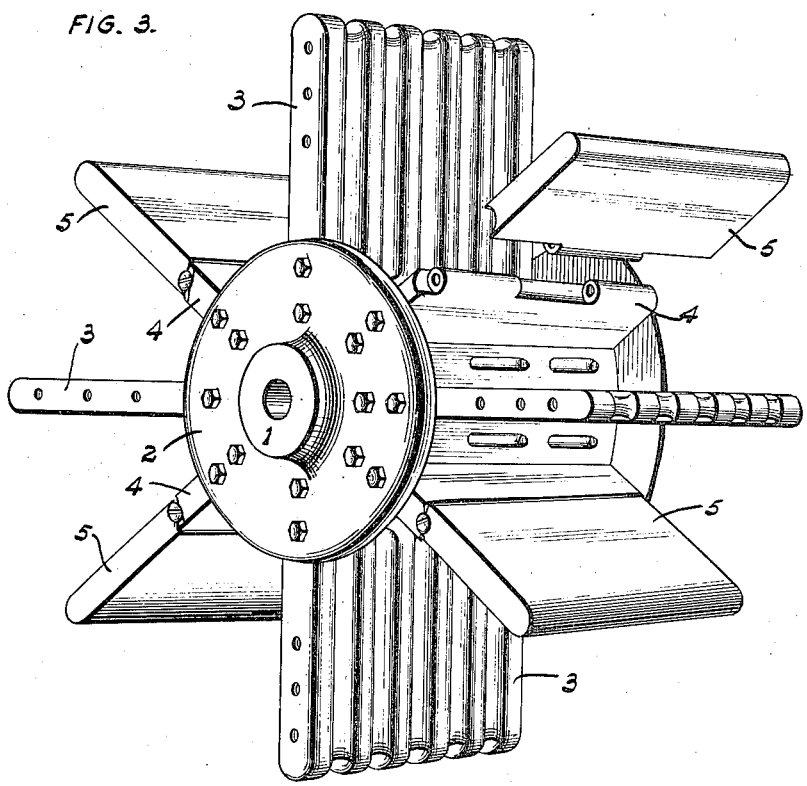
Figure 4:
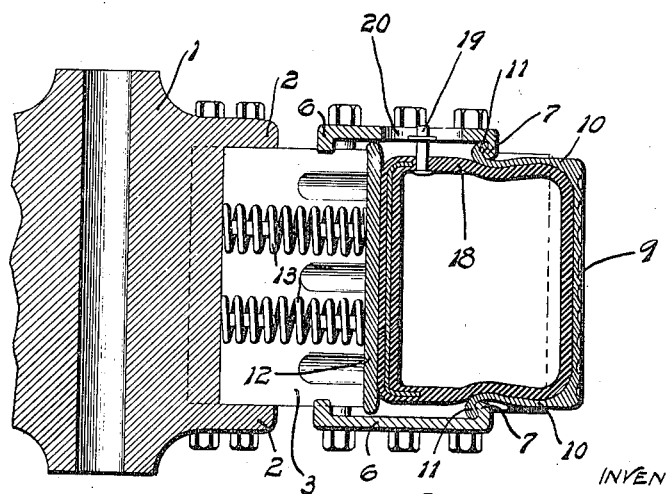

Figure 1 is a side elevation of a vehicle wheel constructed in accordance with my invention, parts being broken away for illustrative purposes. Fig. 2 is a section taken approximately on the line 2—2 of Fig. 1. Fig. 3 is a perspective view of the hub and guide bars of my vehicle wheel. Fig. 4 is a detail section illustrating a modified form of the wheel wherein an inflatable member is made use of in forming the sectional rim. Fig. 5 is a perspective view of one of the metallic tread sections which forms an armor for the elastic rim section. Fig. 6 is a perspective view of a portion of a modified form of the metal tread section. Fig. 7 is a perspective view of one of the rigid supporting plates or guide bars forming a part of the wheel. Fig. 8 is a fragmentary section illustrating a modified arrangement of mounting the tread sections upon the elastic or inflatable segments.

My invention relates to a vehicle wheel particularly intended for use on auto trucks, or like vehicles used for heavy hauling, although the wheel with slight modifications and changes in size can be advantageously used on the ordinary types of automobiles and light weight vehicles.

The principal object of my invention is to construct a wheel having a sectional rim or tread portion made up of a series of armored segments of resilient material thereby doing away with expensive pneumatic tires, which during service are always susceptible to puncture.

A further object of my invention is to produce a vehicle wheel which is characterized by great resiliency, strength, simplicity of construction, durability of its rim portion and ease with which the various parts may be assembled.

To the above purposes my invention consists in certain novel features of construction and arrangement of parts hereinafter more fully described and claimed.

Referring by numerals to the accompanying drawings 1 designates the hub which is preferably cylindrical in form, and provided adjacent its ends with annular flanges 2. Fixed in any suitable manner to the flanges 2 and projecting radially from the hub is a series of rigid guide bars 3 in the form of plates, and the faces of these plates are grooved longitudinally to reduce the area of the wearing surfaces thereof, and consequently minimize the friction between said plates and the movable parts which engage the faces of said plates. Fixed to the flanges 2 between the inner ends of the rigid guide bars 3 are radially arranged blocks 4 and hinged in any suitable manner to the outer ends of these blocks are the inner ends of plates 5, which form the swinging or vibrating guide bars of the wheel.

6 designates side plates in the form of rings, which are fixed in any suitable manner to the rigid guide bars 3, and formed integral with the outer edges of these plates are inwardly projecting flanges 7.

8 designates blocks of elastic material such as rubber, which blocks are segmental in form and fit snugly between the outer portions of the guide bars 3 and 5. Fitted upon the outer portions of these elastic blocks are shoes or tread plates 9, and formed integral with the sides thereof are plates 10 which extend between the outer edges of the plates 6. Formed on the inner edges of these plates 10 are flanges 11 which engage the flanges 7 on said plates 6. The plates 10 are in length slightly shorter than the space between the outer portions of an adjacent pair of the guide bars 3 and 5 which arrangement is necessary to permit the tread plates or shoes to move inwardly when the elastic blocks are compressed. Located beneath each elastic block 8 is a follower plate 12, and interposed between each follower plate and the hub 1 is one or more compression springs 13. These springs normally maintain the elastic blocks and the shoes carried thereby at their outer limit of movement with the flanges 11 against the flanges 7, and said springs tend to oppose any movement of the elastic blocks toward the hub of the wheel, which movement naturally occurs while the wheel is in service, and the shoes on the elastic block successively engage the surface over which the wheel is traveling.

I prefer to form the plate 9 imperforate, as shown in Fig. 5, and where such construction is carried out the outer surface of said plate is corrugated or provided with a series of shallow depressions 14, which form a gripping surface and prevent skidding or slipping of the wheel while the same is in service.

In Fig. 6 I have shown the shoe provided with a perforated tread plate 9ª.

In Fig. 8 I have shown a modified construction wherein the side plates of the shoe are provided with outwardly projecting flanges 15, and passing therethrough are bolts 16 which also pass through flanges 6ª formed on the outer edges of the side plates 6. Mounted upon the bolts 16 between the flanges 6ª and 15 are compression springs 17.

In the construction illustrated in Fig. 4 an inflatable member 18 takes the place of the elastic block 8, and said inflatable member is provided in one side with a valve 19 which projects through a slot 20 formed in one of the side plates 6, thus providing means for introducing air under pressure into the member 18.

When the wheel is in use the shoes or tread plates 9 successively engage the surface of the ground or pavement over which the wheel is traveling, and as each shoe contacts with the ground said shoe will move inwardly a short distance toward the center of the wheel. In so doing the block or rubber inside said shoe will be compressed to a certain degree, and at the same time the corresponding springs 13 will be slightly compressed and thus the load carried by the axle and transmitted to the hub of the wheel is yieldingly supported as the wheel traverses the ground. As the elastic blocks are compressed they will tend to expand lengthwise and, therefore, the force of expansion will be directed immediately against the rigid and hinged guide bars.

As hereinbefore stated there are slight spaces between the ends of the side plates 10 and the guide bars 3 and 5, and this construction permits said guide bars to move inwardly a short distance before contacting with said guide bars. The hinged guide bars 5 are alternately arranged between the rigid guide bars 3 in order to provide a yielding support for one end of each elastic block and which yielding support gives slightly when the elastic block is forced inward and compressed. This arrangement overcomes any tendency of the shoes or tread plates and the elastic blocks to wedge when moved inward during the movement of the wheel over the surface of the ground or pavement, and which wheel is supporting a heavy load.

From the foregoing description it will be seen that I have provided a simple, strong and durable vehicle wheel which overcomes the disadvantages arising from the use of ordinary pneumatic tires, and at the same time have provided a wheel which is amply resilient for all practical purposes, and which wheel is particularly adapted for heavy vehicles, such as motor delivery trucks and the like.

The resilient elements in the form of the elastic blocks are practically indestructible inasmuch as they are protected from wear by the metallic shoes and in case of repair any of the parts of the wheel can be readily removed and replaced by new parts.

It will be noted that a wheel constructed as herein described and shown does not contain any spokes, has no felly, and no continuous outer rim. The yielding or elastic segments form a sectional rim, and said segments are held in place by the compression springs of the proper tension, thereby insuring the requisite degree of resiliency. A wheel constructed as described is exceptionally strong and enables the builders of automobiles and auto trucks to utilize comparatively heavy engines and frames of ample weight and strength besides permitting the wheels to be spaced farther apart than under ordinary circumstances, thus providing for longer trucks or vehicles.

I claim:

1. In a vehicle wheel, a hub, a series of radially arranged plates carried by the hub, each alternate plate being pivotally connected to the hub, armored elastic members arranged between the outer ends of the plates to form the rim of the wheel, and means attached to the fixed radially arranged plates for limiting the lateral and outward movements of the armored elastic members.

2. In a vehicle wheel, a hub, a series of radially arranged plates carried by said hub, certain of which plates are yieldingly mounted on the hub, armored elastic members arranged between the outer ends of the plates and forming the rim of the wheel, yielding members arranged between said elastic members and the wheel hub, and means on the sides of the wheel for limiting the lateral and outward movements of the armored elastic members.

3. In a vehicle wheel, a hub, a series of radially arranged plates rigidly fixed to said hub, a series of guide bars hinged to the hub between the rigid plates, and yielding members arranged between the outer ends of said guide bars and said plates, which yielding members form the rim of the wheel.

4. In a vehicle wheel, a hub, a series of radially arranged plates rigidly fixed to the hub, radially arranged plates hinged to the hub between the rigid plates, elastic members arranged between the outer ends of the plates and tread plates on said elastic members.

5. In a vehicle wheel, a hub, a series of radially arranged plates rigidly fixed to the hub, radially arranged plates hinged to the hub between the rigid plates, elastic members arranged between the outer ends of the plates, tread plates on said elastic members, and yielding pressure means located between the elastic blocks and the wheel hub.

6. In a vehicle wheel the combination with a hub and a series of radially arranged plates carried by said hub, certain of which plates are yieldingly mounted, of a sectional wheel rim comprising a series of segmental elastic members independently mounted between the outer ends of the plates, a follower plate beneath each segmental elastic member, and a spring interposed between each follower plate, and the wheel hub.

7. In a vehicle wheel a hub, radially arranged plates carried by said hub, certain of which plates are hinged to the hub, side plates fixed to the rigid plates and sectional rim members yieldingly mounted in the spaces between the outer ends of the radially arranged plates and the outer portions of the side plates.

8. In a vehicle wheel, a hub, a series of radially arranged plates carried by said hub, a series of plates alternately arranged between the first mentioned series of plates, and which second mentioned series of plates are hinged to the hub, side plates fixed to the rigid plates, sectional rim members yieldingly mounted in the spaces between the outer ends of the radially arranged plates and the outer portions of the side plates, and yielding pressure means located between the sectional rim members and the wheel hub.

9. In a vehicle wheel, the combination with a hub, of a sectional rim comprising a series of segmental elastic blocks, and a series of alternately arranged rigidly fixed and hinged supporting plates carried by and projecting radially from the hub, against which plates the elastic blocks engage.

10. In a vehicle wheel, the combination with a hub, of a sectional rim comprising a series of segmental elastic blocks, supporting plates carried by and projecting radially from the hub, against which plates the elastic blocks engage, and certain of which radially arranged plates are pivotally connected to the hub.

11. In a vehicle wheel the combination with a hub, of a sectional rim comprising a series of segmental elastic blocks supporting members radially arranged around the hub and extending between the ends of the segmental elastic members, each alternate supporting member being hinged to the wheel hub, yielding pressure means between the hub and the elastic members for normally forcing the same outward, and means for limiting the outward movement of the segmental members.

12. In a vehicle wheel, a hub, a series of plates carried by and radially arranged around the hub, certain of which plates are hinged, resilient armored segmental sections arranged between the outer portions of the plates, and which resilient segmental sections are equal in width to the width of the radially arranged plates.

13. In a vehicle wheel, a hub, a series of plates carried by and radially arranged around the hub, certain of which plates are hinged, resilient armored segmental sections arranged between the outer portions of the plates, which resilient segmental sections are equal in width to the width of the radially arranged plates, means for limiting the outward movement of the segmental sections, and yielding pressure means arranged between the hub and the segmental sections.

In testimony whereof I hereunto affix my signature in the presence of two witnesses, this 3rd day of September, 1910.

FRANKLIN A. FROMMANN.

Witnesses:
M. P. SMITH,
B. S. REID.